United States Patent [19]
Eustache et al.

[11] Patent Number: 6,123,384
[45] Date of Patent: *Sep. 26, 2000

[54] MOTOR VEHICLE TAILGATE COMPRISING AN ACCESSORY MOUNTING PLATE

[75] Inventors: Jean Pierre Eustache, Antony; Eric Detais, Tours; Alexandre Goullieux, Airaines; Joel Girard, Abbeville, all of France

[73] Assignees: Valeo Systemes d'Essuyage, La Verriere; Valeo Systemes De Fermeture, Sailly Flibeaucourt, both of France

[ * ] Notice: This patent issued on a continued prosecution application filed under 37 CFR 1.53(d), and is subject to the twenty year patent term provisions of 35 U.S.C. 154(a)(2).

[21] Appl. No.: 09/086,194

[22] Filed: May 28, 1998

[30]    Foreign Application Priority Data

Jun. 2, 1997 [FR] France ................................. 97 06754

[51] Int. Cl.⁷ ................................ B60J 1/20; A47L 1/02; B60L 1/14; H02P 1/04
[52] U.S. Cl. .......................... 296/146.2; 49/502; 70/264; 307/10.1; 15/250.3; 15/250.31; 318/443
[58] Field of Search ................................. 296/56, 146.1, 296/146.2, 152; 49/502; 292/DIG. 23, DIG. 43; 70/264; 340/463, 468, 475, 479; 307/9.1, 10.1, 10.8; 361/825, 826; 200/61.44, 61.64, 61.65, 61.66, 61.67, 61.68; 15/250.19, 250.3, 250.31; 318/443, 444

[56]            References Cited

U.S. PATENT DOCUMENTS

| | | | |
|---|---|---|---|
| 4,119,341 | 10/1978 | Cook | 296/146 |
| 4,848,829 | 7/1989 | Kidd | 296/152 |
| 4,924,630 | 5/1990 | Lomasney et al. | 49/502 |
| 5,153,960 | 10/1992 | Redick | 362/83.2 |
| 5,170,097 | 12/1992 | Montemurro | 315/83 |
| 5,584,144 | 12/1996 | Hisano | 49/502 |
| 5,621,942 | 4/1997 | Eustache et al. | 15/250.3 |
| 5,730,028 | 3/1998 | Maue et al. | 74/480 R |
| 5,799,358 | 9/1998 | Unvrerich | 15/250.01 |
| 5,844,367 | 12/1998 | Agans, Jr. | 315/84 |
| 5,852,943 | 12/1998 | Dutka et al. | 70/237 |

FOREIGN PATENT DOCUMENTS

| | | | |
|---|---|---|---|
| 0 044 649 | 1/1982 | European Pat. Off. . | |
| 0 111 457 | 6/1984 | European Pat. Off. . | |
| 0 506 514 | 9/1992 | European Pat. Off. . | |
| 3544124 | 7/1987 | Germany | 340/468 |
| 38 15 442 | 12/1988 | Germany . | |
| 4212261 | 10/1993 | Germany | 296/146.2 |
| 296534 | 7/1990 | Japan | 296/152 |

OTHER PUBLICATIONS

French Search Report dated Feb. 13, 1998.

*Primary Examiner*—D. Glenn Dayoan
*Assistant Examiner*—Paul Chenevert
*Attorney, Agent, or Firm*—Morgan & Finnegan, L.L.P.

[57]            ABSTRACT

The invention relates to a motor vehicle tailgate of the type in which the tailgate carries a series of accessories, characterized in that a least some of the accessories are premounted on a mounting plate which is attached to the tailgate on the inside of an external cladding panel of the tailgate and which carries a local managing circuit for connecting the accessories to electric circuits of the vehicle for supplying power to, controlling and monitoring the accessories.

36 Claims, 4 Drawing Sheets

MOTOR VEHICLE TAILGATE COMPRISING AN ACCESSORY MOUNTING PLATE

BACKGROUND OF THE INVENTION

The invention relates to a motor vehicle tailgate comprising an accessory mounting plate.

Numerous accessories may be attached to the tailgate of a motor vehicle, especially when this is a large-sized rear hatch.

Thus, the rear hatch may support, in addition to its fastening and locking system, an electric wiper motor, a number plate and its lighting systems, but also possibly the compulsory third brake light, or even all or part of the rear light clusters.

All the accessories, which are of course produced independently of the bodywork panel that the rear hatch constitutes, have therefore to be mounted on this rear hatch when the vehicle is being assembled.

Now, the increased number of accessories leads to an increase in assembly time and leads to higher risks of assembly defects.

Furthermore, it is necessary to provide, for each of the electrical accessories, on the one hand the electrical power supply and, on the other hand, the means of controlling these accessories, and finally, monitoring means which make it possible in particular to provide information on the operational condition of the accessories either to the driver, for example via warning lights on the instrument panel, or to a central unit for the electronic management of the vehicle.

These multiple connections, which have to be carried out on the vehicle assembly line, are themselves also potential sources of defects and it is therefore necessary to check them after assembly.

As can be seen, the increased number of electrical accessories carried by the vehicle tailgate may lead to a significant increase in the total assembly time for this rear hatch.

Document EP-A-0,506,514 describes a composite rear hatch comprising a frame which delimits an opening, an upper part of which is intended to be covered by a window glass and a lower part of which is intended to be covered by a cladding module which carries both the outer cladding skin of the rear hatch and some of the accessories that are generally to be found on the rear hatch.

As is specified in the aforementioned document, the purpose of this module is to make it easier to produce alternative forms of rear hatch without reviewing the latter's bearing structure which is formed by the frame.

However, this document says nothing about the means of positioning the various accessories on the one hand relative to each other and on the other hand with respect to the rear hatch. Nor does it specify how the module is positioned with respect to the frame of the rear hatch and with respect to the rest of the vehicle in order to preserve the external appearance of the rear hatch once assembled. Finally, nor is anything said about the means of connecting the accessories to their electric power-supply and control circuits.

This document therefore teaches a new modular design of the very construction of the rear hatch but proposes nothing innovative regarding the mounting of the accessories on this rear hatch.

Document EP-A1-0,044,649 describes and depicts a rear hatch or rear door assembly in which a stiffening plate is attached to a glass panel by, among other things, a special way of mounting the wiper motor and the tailgate closure mechanism. In that way, these accessories play a part in attaching the plate, and pre-mounting them cannot be envisaged. This document therefore proposes the mounting of a stiffening plate to strengthen a tailgate only when the latter consists solely of a glass panel without an inherent structure.

Likewise, the purpose of document DE-A1-3,815,442 is to teach, within the context of a tailgate that consists of a glass panel, the mounting of accessories on a plate which is itself attached to the glass panel. However, apart from the mounting simplicity which avoids having to attach these accessories to a material as fragile as glass, there is no intention of taking any particular advantage of the possibility of pre-mounting the accessories on the plate.

In particular, this document does not in any way envisage for the plate to carry means of connecting the accessories to electric circuits of the vehicle. Thus, it is not possible to be able to test all of the accessories in a simple way before the plate is mounted on the tailgate.

Thus, this document too relates merely to the possibility of mounting the accessories, in a simple and reliable way, on a tailgate panel made of glass.

BRIEF SUMMARY OF THE INVENTION

The subject of the invention is therefore to propose a new design of the way in which accessories, especially electrical accessories, are mounted on a vehicle tailgate which makes it possible to reduce substantially the time taken by the motor manufacturer to assemble the rear hatch while at the same time ensuring optimum build quality checked using simplified test procedures.

To this end, the invention proposes a motor vehicle tailgate of the type described earlier, characterized in that at least some of the accessories are pre-mounted on a mounting plate which is attached to the tailgate on the inside of the tailgate and which carries means of connecting the accessories to electric circuits of the vehicle for supplying power to, controlling and monitoring the accessories.

According to other features of the invention:

- the mounting plate comprises means of positioning and means of attachment on the rear hatch;
- the mounting plate comprises at least two parts which can be moved one with respect to the other and each of which is equipped with means of positioning and attachment on the rear hatch, and each of which carries at least one accessory;
- two parts of the mounting plate are connected by a deformable region of the plate;
- the plate comprises a main body and an auxiliary body which are connected together by a deformable connecting element;
- the mounting plate carries a wiper motor which is attached to the plate via at least one vibration damper;
- the means of connecting the mounting plate comprise a single centralized connector;
- the means of connecting the mounting plate form a multiplex connection;
- the mounting plate carries an electronic circuit for controlling the accessories carried by the plate;
- the operation of the pre-mounted accessories is checked before the mounting plate is mounted on the tailgate via the means of connecting the mounting plate;
- an accessory is pre-mounted on the mounting plate so that it can be transported, and it is subsequently attached directly to the tailgate after the mounting plate has been attached to the tailgate;

the mounting plate carries at least one accessory which is accessible from the outside of the tailgate through an opening formed in the external cladding panel of the tailgate;

the mounting plate is attached to the external cladding panel of the tailgate;

the tailgate comprises a bearing structure which is articulated to the body of the vehicle, and to which the external cladding panel is attached, and the mounting plate is attached to the bearing structure;

the mounting plate is intended to be covered, on the inside, by a cladding cover.

The invention also relates to an accessory mounting plate incorporating any one of the previous features.

BRIEF DESCRIPTION OF THE DRAWINGS

Other features and advantages of the invention will become clear from reading the detailed description which follows, for an understanding of which reference will be made to the appended drawings in which:

DETAILED DESCRIPTION OF THE INVENTION

Figure 1:
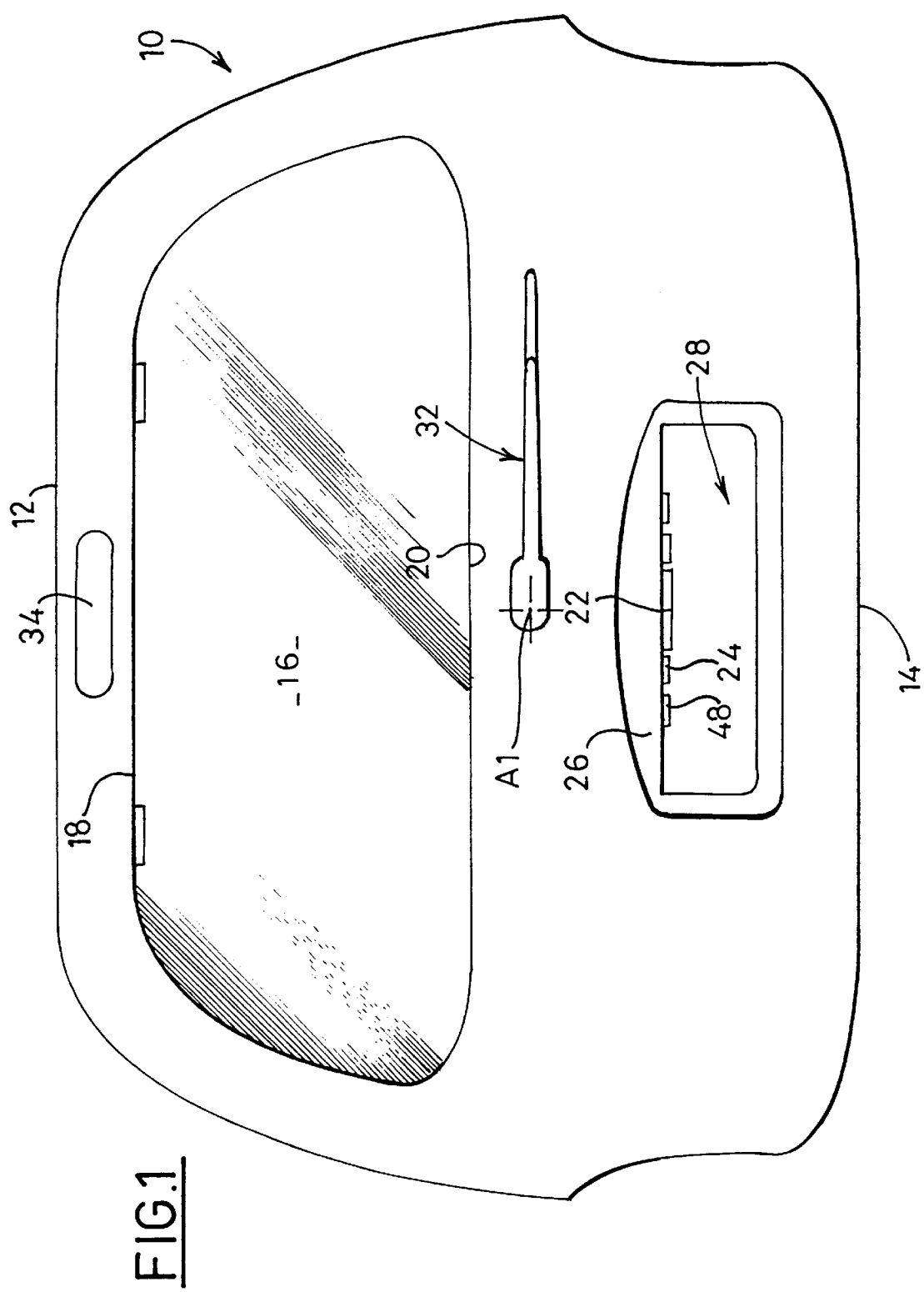
Figure 2:
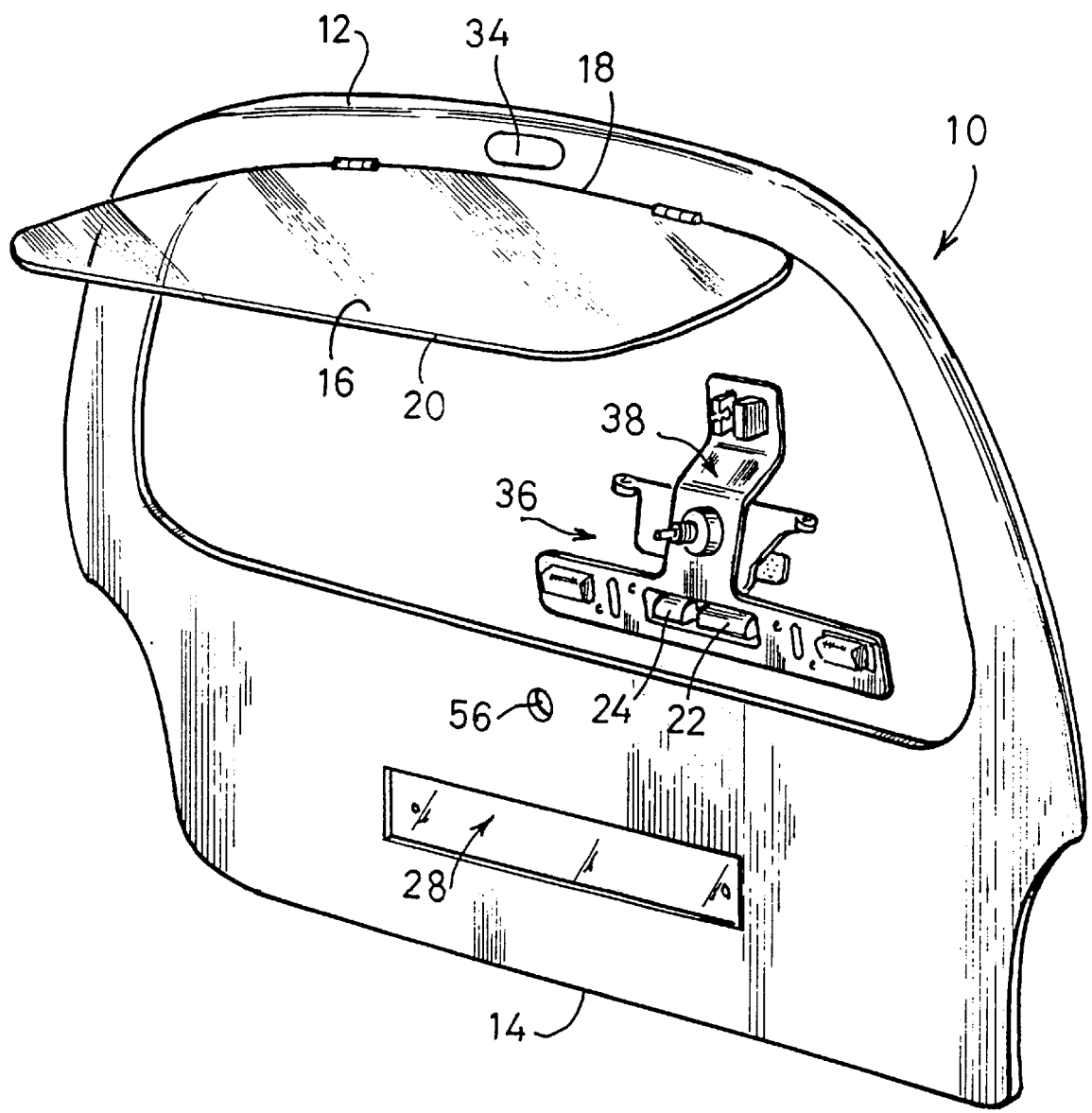
Figure 3:
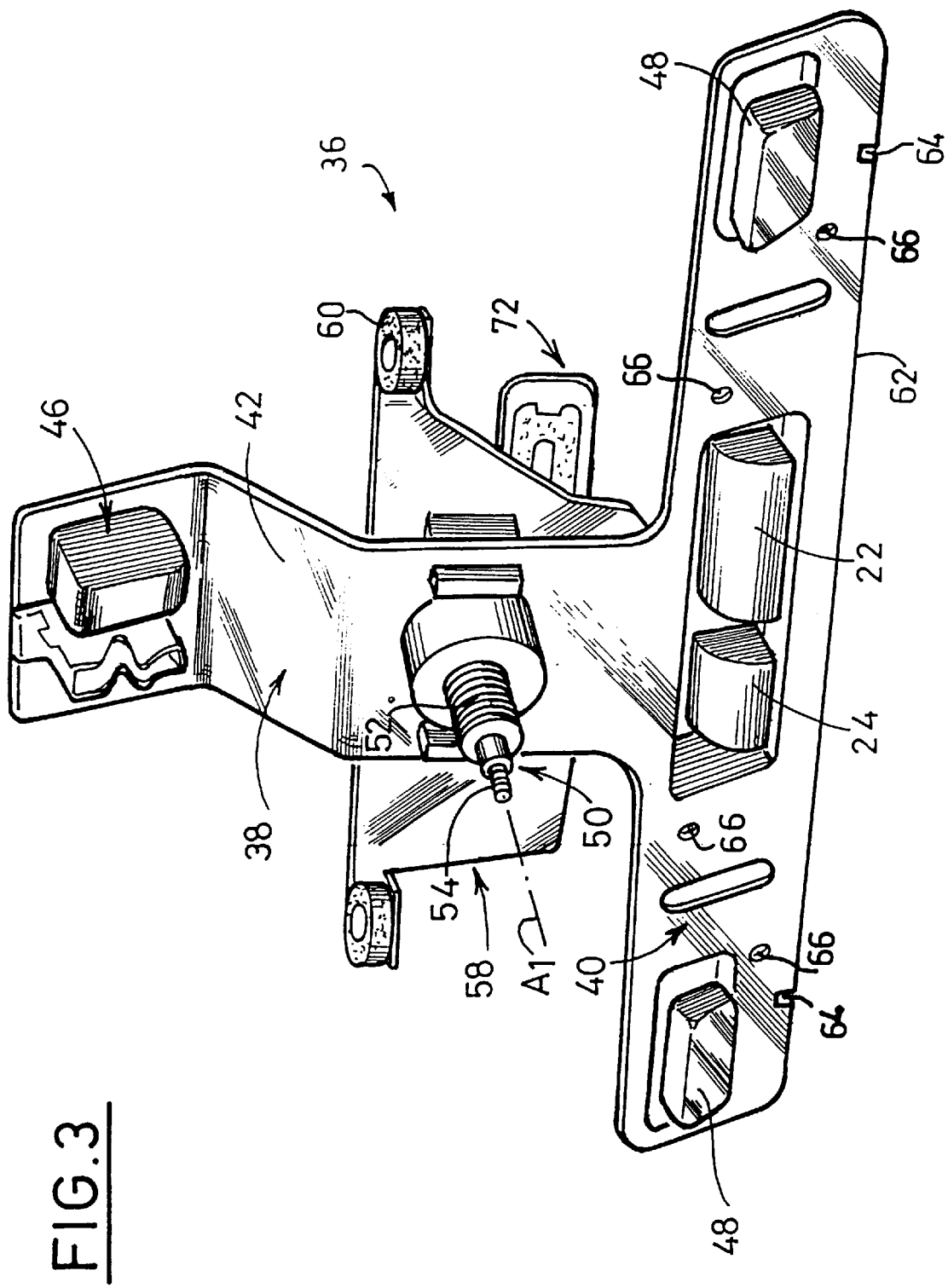
Figure 4:
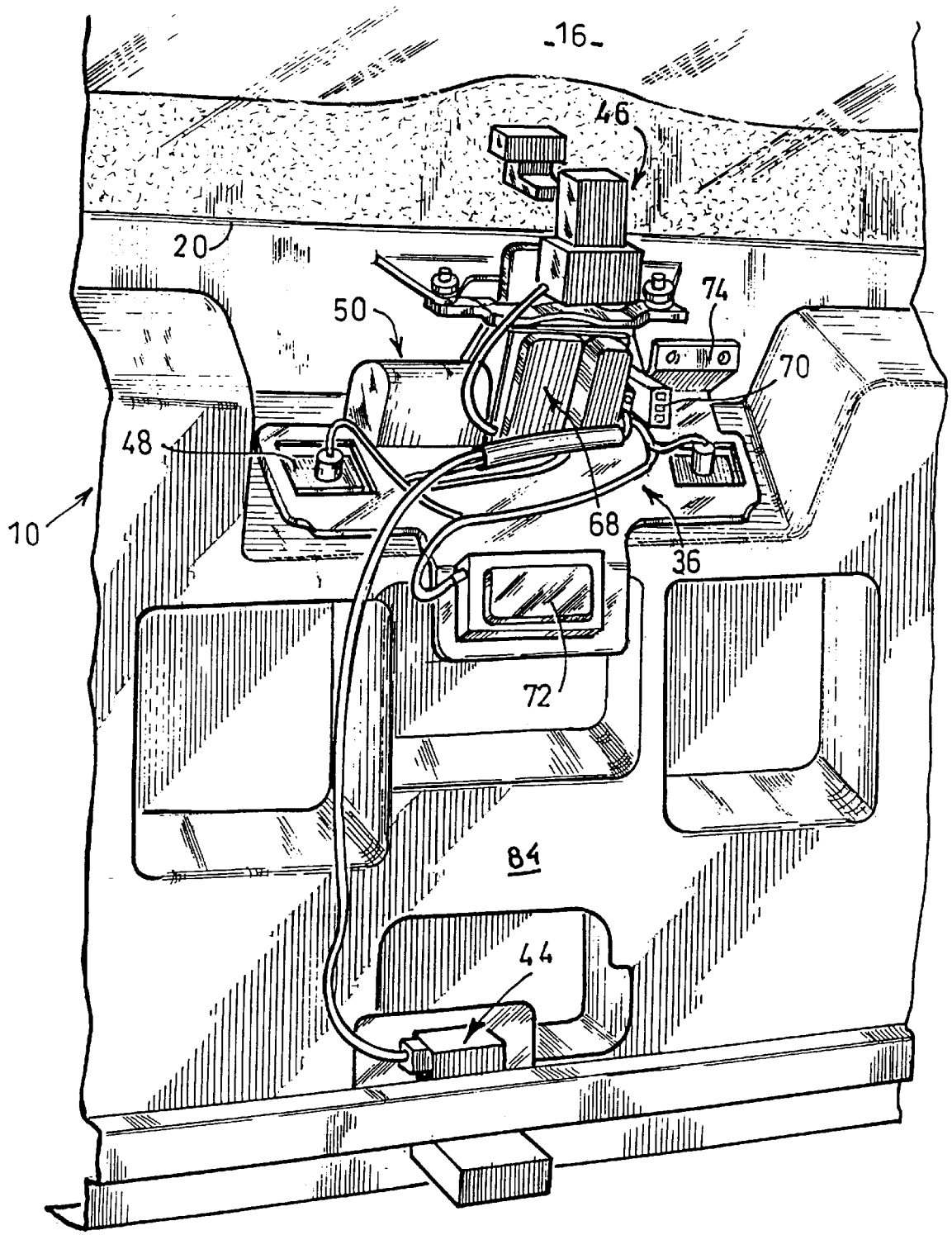

FIG. 1 is an external view of a motor vehicle tailgate;

FIG. 2 is a diagrammatic view in exploded perspective illustrating an accessory mounting plate intended to be attached to a motor vehicle tailgate on the inside thereof;

FIG. 3 is a view in perspective on a larger scale of the mounting plate of FIG. 2; and FIG. 4 is a view illustrating another plate according to the invention after it has been mounted on a vehicle tailgate.

FIG. 1 depicts a view from the outside of a motor vehicle rear hatch 10. The rear hatch 10 is intended, for example, to be articulated by an upper horizontal edge 12 to the body (not depicted) of a motor vehicle and must therefore be fitted, at its lower edge 14, for example in a central position, with means of locking the rear hatch 10 to the body in order to keep it in a closed position. Of course, such a rear hatch may be articulated to the body about a vertical axis by one of its lateral edges, the opposite lateral edge then carrying the locking means.

The rear hatch 10 carries a rear screen glass 16 which is, for example, articulated to the rear hatch 10 by its horizontal upper edge 18 so that it can be moved upwards into an open position independently of the opening of the rear hatch 10.

The rear hatch 10 must therefore be fitted with a device for locking the window glass 16 which interacts, for example, with the lower edge 20 thereof.

Of course, it must be possible for the device for locking the rear hatch to the body and for locking the window glass 16 to the rear hatch 10 to be controlled from the outside using two control members 22, 24 which are advantageously partially concealed by a cladding cover 26 which overhangs the upper edge of a place 28 for a vehicle number plate. This cover 26 may also house means 48 of illuminating the number plate.

The rear hatch 10 depicted in the figures also carries a device for wiping the window glass 16 which in particular comprises a wiper 32 which is driven with a sweeping back and forth movement about an axis A1 approximately perpendicular to the plane of the window glass 16 and of the rear hatch 10. In the example depicted, the wiper 32 occupies a position of rest in which it extends approximately horizontally below the lower edge 20 of the window glass 16 so as not to hamper the opening thereof.

The rear hatch 10 depicted also carries a brake light 34, also known as a stop light, which supplements, according to legislation, rear light clusters (not depicted) which in this case are carried by the body of the vehicle, but which can just as easily be carried, at least in part, by the rear hatch 10.

Thus, the rear hatch 10 depicted comprises a number of equipment items, some of which incidentally are electrical and therefore need to be connected to electric power-supply, control and monitoring circuits belonging to the vehicle.

According to the teaching of the invention, the accessories which are intended to be carried by the rear hatch 10 are pre-mounted on a mounting plate 36 which is intended to be attached to the rear hatch 10.

The rear hatch 10 may, for example, be produced in the form of a sheet pressing, possibly made up of an external cladding panel 84 and of an internal reinforcing sheet, in which case the mounting plate 36 is attached directly to the rear hatch, against the internal face of the external cladding panel.

The rear hatch 10 may also be produced in the form of a support frame articulated to the body of the vehicle, for example produced in the form of a tubular assembly, to which an external cladding panel, for example made of composite material, can then be attached. In this case, it may be preferable for the mounting plate 36 to be attached to the reinforcing structure, still on the inside of the external cladding panel 84.

In any case, a cladding cover intended to cover the mounting plate 36 on the inside of the vehicle may be provided.

In the invention embodiment more specifically illustrated in FIG. 3, the mounting plate 36 according to the invention comprises a main body 38 that has a horizontal lower portion 40 and a vertical upper portion 42 which together form an inverted T.

The horizontal lower portion 40 carries, in particular, the two operating members 22, 24 which respectively control the devices 44, 46 for locking the rear hatch 10 to the body and for locking the window glass 16 to the rear hatch 10. In this respect, the lower portion 40 forms an element that strengthens the rigidity of the rear hatch and allows the forces exerted on the rear hatch in order to lift it into its open position to be taken up.

In this instance, the locking devices 44, 46 are electric locking devices which means that there is no need to provide linkages between the operating member and the corresponding locking device, a simple electrical connection between the two being needed.

As can be seen more specifically in FIG. 3, the device 46 for locking the window glass 16 is attached directly to the mounting plate 36, at the upper part of the vertical portion 42.

By contrast, as can be seen in FIG. 4, the locking device 44 must, in order to lock the rear hatch 10, be arranged at the lower edge 14 thereof. Now, in order not to increase the bulk of the mounting plate 36 needlessly, this mounting plate lies, for example, almost completely between the lower edge 20 of the window glass 16 and the place 28 for the number plate.

Also, the device 44 for locking the rear hatch 10 is pre-mounted on a tab 74 of the mounting plate 36 for the purpose of transporting it and for the purpose of electrically connecting it, in particular to its corresponding operating member 22.

When the mounting plate 36 is attached to the vehicle, it is then possible to move the locking device 44 into its final position in which it is, for example, attached directly to the rear hatch 10, at the lower edge 14, without having to make another electrical connection, which would then have to be tested.

Likewise, it is possible to envisage for the third brake light 34 itself also to be pre-mounted on the support plate 36, for it to be connected electrically to this support plate by a long enough cable, and for it subsequently to be attached permanently to the rear hatch in the position depicted in the figures, above the window glass 16.

The lower portion 40 of the mounting plate 36 also comprises, at each of its transverse ends, the two lighting units 48 for the number plate which are intended to protrude to the outside through two corresponding holes formed in the exterior panel of the rear hatch. Sealing around the holes will advantageously be achieved using seals (not depicted) carried by the lower portion 40.

It is intended that a device 50 for driving the wiper 32 be attached to the mounting plate 36 in a central position. The drive device 50 in particular comprises a gear motor unit (not depicted) which drives back and forth in rotation a drive shaft 52 of axis A1, one free end 54 of which is intended to protrude to the outside of the rear hatch 10, through an opening 56 formed therein.

Of course, the mounting plate 36 according to the invention may also comprise other accessories such as a lamp 72 for illuminating the inside of the vehicle boot or such as a device for spraying washer fluid onto the window glass 16, this device comprising, for example, a reservoir for fluid and a pump.

According to one aspect of the invention, the plate 36 may comprise several parts capable of having a certain degree of freedom of positioning one with respect to another.

This is because some of the accessories carried by the plate 36 need to be positioned relatively accurately with respect to the outer skin of the rear hatch 10 but also with respect to other components such as the window glass 16.

Also, it may be advantageous to envisage for some of the accessories to be attached to a part of the plate which can be moved slightly with respect to the rest of the plate 36 and which comprises its own means of positioning and of attachment on the rear hatch 10.

Thus, when the plate 36 is mounted on the rear hatch 10, each accessory can be positioned independently and precisely with respect to the rear hatch 10, without it being necessary to define excessively tight tolerances on the positioning of each of the accessories on the plate 36.

For this, it is possible to contrive for two parts of the plate 36 to be produced integrally as a single part and joined together by a deformable region.

Advantageously, if the plate 36 is produced in the form of a bent or pressed sheet, this deformable region may be produced in the form of a concertina-folded region of sheet so that the two parts of the plate 36 can easily be orientated one with respect to the other.

By way of example, it is possible to contrive for the upper part 80 of the vertical portion 42 of the main body 38 of the plate 36 to be connected to the rest of the vertical portion 42 by a deformable region 82 so as to allow precise positioning of the device 46 for locking the window glass 16.

However, each of the parts of the main body 38 of the plate 36 is equipped with means which allow it to be positioned and attached rigidly and precisely on the rear hatch 10.

Thus, as can be seen in FIG. 3, the lower portion 40 is equipped, on its lower edge 62, with two notches 64 intended to interact with positioning studs (not depicted) of the rear hatch, and also with four drillings 66 for the passage of fixing screws (not depicted).

With the same objective, the device 50 for driving the wiper 32 is mounted on an auxiliary body 58 of the plate 36, which body is connected flexibly to the main body 38, that is to say with a certain ability to move in at least one direction, for example via damping devices. The auxiliary body 58 is therefore capable of being positioned optimally with respect to the opening 56 in the cladding panel.

As can be seen in the figures, the auxiliary body 58 moreover comprises independent means of attachment to the rear hatch 10 and these also comprise damping blocks 60. Thus, this arrangement also avoids vibration likely to be generated at the gear motor unit being transmitted to the rear hatch 10.

According to the invention, the various parts of the plate 36 must nevertheless form an entity that is rigid and coherent enough that it can be transported and handled easily.

According to another aspect of the invention, more particularly visible in the alternative embodiment of FIG. 4, all of the electrical accessories carried by the mounting plate 36 are connected to vehicle power-supply, control and monitoring circuits by centralized connection means.

Provision is advantageously made for the mounting plate 36 to comprise a local electronic circuit 68 which manages all of the functioning of each of the accessories carried by the plate 36. Thus, this local electronic circuit, which is arranged, for example, close to the electric motor of the wiper drive device 50, will be able to manage, in particular, the operation of the wiper 32, or the operation of the electric devices 44, 46 for locking the rear hatch 10 and the window glass 16.

In addition, this local electronic circuit makes it possible to manage any interactions there may be between the various accessories. Thus, it is necessary for it not to be possible to command the opening of the window glass 16 until the wiper has reached its position of rest depicted in FIG. 1. On the other hand, it must not be possible to be able to switch on the wiper 32 if the window glass 16 has already been opened. These inhibitions may be managed by the local electronic circuit 68.

Likewise, the electronic circuit 68 carried by the mounting plate 36 can be connected to an electronic unit of the vehicle, arranged, for example, in the cabin, for example in order to fulfil theft-prevention functions. Thus, the electronic unit may, after recognizing a coded signal, transmit to the electronic circuit of the mounting plate 36 an information item to make this electronic circuit inhibit the use of the members 22, 24 for operating the rear hatch 10 and the window glass 16. Thus, without any specific additional device, the tailgate 10 is protected against break-in.

As a preference, the electrical connection of all the accessories carried by the mounting plate 36 with the electric circuits of the vehicle will be achieved using a single connector 70. As this connection takes place via the local electronic circuit 68, the latter will be able to manage a multiplexed connection which makes it possible to reduce the number of physical conductors in the vehicle wiring harness.

As can be seen, the rear hatch 10 equipped with a mounting plate 36 according to the invention has the advantage that all the functioning of the accessories carried by this tailgate 10 can be tested before the accessories are mounted on the vehicle.

Thus, in addition to the assembly time saved, the procedures for testing the vehicle once it has been built thus become considerably less burdensome. Likewise, the transporting and handling of the plate thus equipped, from its place of assembly at the equipment manufacturer's as far as the place where it is mounted on the vehicle at the motor manufacturer's becomes easier.

In terms of industrial methods, the rear hatch according to the invention allows the motor manufacturer who is assembling the vehicle to concentrate on using methods of mounting a tailgate of a conventional type on a body, which methods are those with which he has especial familiarity, with, as the only concern, the conventional criteria of positioning the external cladding panel of the tailgate with respect to the rest of the bodywork.

The operation of installing the accessories then becomes confined to attaching a pre-assembled mounting plate, each part of which comprises means for automatically ensuring precise positioning of the accessories it carries, in particular with respect to the external cladding panel of the rear hatch.

What is claimed is:

1. Motor vehicle tailgate assembly comprising:

a plurality of accessories capable of being pre-mounted on a mounting plate which is attached to a tailgate on an external cladding panel of the tailgate;

a local managing circuit connected to each of the plurality of accessories, the local managing circuit being configured to manage the functioning of each of the plurality of accessories mounted on the mounting plate; and means for connecting the local managing circuit to an electronic unit of a motor vehicle, wherein said mounting plate supports the local managing circuit and the connecting means.

2. Tailgate assembly according to claim 1, wherein the mounting plate comprises means of positioning and means of attachment on the tailgate.

3. Tailgate assembly according to claim 2, wherein the mounting plate comprises at least two parts which can be moved one with respect to the other and each of which is equipped with means of positioning and attachment on the tailgate and each of which carries at least one accessory.

4. Tailgate assembly according to claim 3, wherein the two parts of the mounting plate are connected by a deformable region of the mounting plate.

5. Tailgate assembly according to claim 3, wherein the mounting plate comprises a main body and an auxiliary body which are connected together by a deformable connecting element.

6. Tailgate assembly according to claim 5, wherein the mounting plate carries a wiper motor which is attached to the plate via at least one vibration damper.

7. Tailgate assembly according to claim 1, wherein the means of connecting the accessories of the mounting plate to the electric circuits of the vehicle comprise a single centralized connector.

8. Tailgate assembly according to claim 7, wherein the means for connecting the accessories of the mounting plate form a multiplex connection.

9. Tailgate assembly according to claim 1, wherein the mounting plate carries an electronic circuit for controlling the accessories carried by the mounting plate.

10. Tailgate assembly according to claim 1, wherein the operation of the pre-mounted accessories is checked before the mounting plate is mounted on the tailgate via the means of connecting the accessories of the mounting plate.

11. Tailgate assembly according to claim 1, wherein an accessory is pre-mounted on the mounting plate so that the accessory is capable of being transported, and that the accessory is subsequently attached directly to the tailgate after the mounting plate has been attached to the tailgate.

12. Tailgate assembly according to claim 1, wherein the mounting plate carries at least one accessory which is accessible from the outside of the tailgate through an opening formed in the external cladding panel of the tailgate.

13. A motor vehicle comprising the tailgate assembly of claim 1.

14. A method of supplying power to, controlling and monitoring a plurality of accessories of a motor vehicle tailgate comprising the steps of:

pre-mounting the plurality of accessories to a mounting plate;

connecting the plurality of accessories to a local managing circuit attached to the mounting plate, wherein said local managing circuit is configured to manage the functioning of the plurality of accessories;

connecting the local managing circuit to electric circuits of the vehicle by a single centralized connector, on the mounting plate;

checking the operation of the pre-mounted accessories using the single centralized connector; and attaching the mounting plate to the motor vehicle tailgate.

15. An apparatus for pre-mounting a plurality of tailgate accessories comprising:

a main body;

an auxiliary body flexibly attached to the main body;

a local managing circuit attached to the apparatus and connected to each of the plurality of accessories, wherein said local managing circuit manages the functioning of the plurality of accessories mounted on the mounting plate; and a single centralized connector managed by the local managing circuit for connecting a motor vehicle electronic unit to the local managing circuit, wherein the apparatus supports the single centralized connector.

16. An apparatus according to claim 15, wherein the main body includes a horizontal lower portion and a vertical upper portion, said vertical upper portion having a window locking device.

17. An apparatus according to claim 16, wherein said horizontal lower portion and said vertical upper portion each carries at least one of the plurality of accessories.

18. An apparatus according to claim 15, wherein the single centralized connector forms a multiplex connection.

19. An apparatus according to claim 15, wherein the apparatus further comprises a cladding cover for covering the apparatus.

20. An apparatus according to claim 15, wherein the apparatus is attached to the tailgate on the inside of an external cladding panel.

21. An apparatus according to claim 15, wherein the operation of the plurality of pre-mounted accessories is checked before the apparatus is mounted on the tailgate by the single centralized connector.

22. A mounting plate for pre-mounting a plurality of tailgate accessories comprising:

a main body including a horizontal lower portion and a vertical upper portion;

an auxiliary body flexibly connected to the main body, said auxiliary body having a device for driving a wiper mounted thereon;

a local managing circuit attached to the mounting plate and connected to each of the plurality of accessories, said local managing circuit manages the functioning of each of the plurality of accessories; and a single centralized connector managed by the local managing circuit for connecting motor vehicle electric circuits to the local managing circuit, wherein said single centralized connector forms a multiplex connection and is supported by the mounting plate.

23. A mounting plate according to claim 22, wherein the mounting plate is attached to the tailgate on the inside of an external cladding panel.

24. A mounting plate according to claim 22, wherein the operation of the plurality of pre-mounted accessories is checked before the mounting plate is mounted on the tailgate by the single centralized connector.

25. A mounting plate according to claim 22, wherein said horizontal lower portion and said vertical upper portion each carry at least one of the plurality of accessories.

26. A mounting plate according to claim 22, wherein the horizontal lower portion of the main body includes two operating members to control devices for locking the tailgate to a motor vehicle body and a window glass to the tailgate.

27. A mounting plate according to claim 22, wherein the horizontal lower portion of the main body includes a device for illuminating a number plate of the vehicle.

28. A mounting plate according to claim 22, wherein the upper part of the vertical upper portion of the main body includes a device for locking a window glass to the tailgate.

29. A mounting plate according to claim 22, wherein the auxiliary body includes damping blocks.

30. A mounting plate according to claim 22, wherein at least one of the plurality of accessories is accessible from the outside of the tailgate through an opening formed in an external cladding panel of the tailgate.

31. A mounting plate according to claim 22, wherein the auxiliary body carries a lamp for illuminating the inside of a vehicle boot.

32. A mounting plate according to claim 22, wherein the auxiliary body carries a device for spraying washer fluid onto a window glass.

33. A mounting plate for a tailgate comprising:

means for pre-mounting tailgate accessories to the mounting plate;

means for connecting the plurality of accessories to a local managing circuit attached to the mounting plate, wherein said local managing circuit manages the functioning of each of the plurality of accessories;

means for connecting an electric circuit of the vehicle to the local managing circuit;

means for checking the operation of the pre-mounted accessories; and means for attaching the mounting plate to the motor vehicle tailgate.

34. Motor vehicle tailgate assembly comprising:

a mounting plate including a main body and an auxiliary body flexibly attached to the main body, the main body includes a horizontal lower portion and a vertical upper portion;

a device for locking a rear hatch pre-mounted on the vertical upper portion of the mounting plate;

means for illuminating a number plate pre-mounted on the horizontal lower portion of the mounting plate;

a device for driving a wiper pre-mounted in a central position of the horizontal lower portion;

a local managing circuit attached to the mounting plate and connected to the plurality of accessories, wherein said local managing circuit manages the functioning of the device for locking the rear hatch, the means for illuminating the number plate, and the device for driving the wiper; and a single centralized connector forming a multiplex connection managed by the local managing circuit for connecting the local managing circuit to an electronic unit of a motor vehicle, wherein the mounting plate carries the single centralized connector.

35. A mounting plate for a tailgate comprising:

a main body including a horizontal lower portion and a vertical upper portion;

an auxiliary body flexibly connected to the main body, wherein the auxiliary body includes a device for driving a wiper, a device for spraying washer fluid, a lamp for illuminating an inside of a vehicle boot and damping blocks for independently attaching the auxiliary body to the tailgate;

a device for locking a rear hatch pre-mounted on the vertical upper portion of the mounting plate;

means for illuminating a number plate pre-mounted on the horizontal lower portion of the mounting plate;

a local managing circuit connected to each of the plurality of accessories and attached to the mounting plate, wherein said local managing circuit manages the functioning of the device for locking the rear hatch, the means for illuminating the number plate, the device for driving the wiper, the device for spraying washer fluid and the lamp for illuminating the inside of the vehicle boot; and a single centralized connector forming a multiplex connection managed by the local managing circuit for connecting the local managing circuit to an electronic unit of a motor vehicle, wherein the mounting plate carries the single centralized connector.

36. Motor vehicle tailgate assembly comprising:

a plurality of accessories capable of being pre-mounted on a mounting plate which is attached to a tailgate;

a local managing circuit connected to each of the plurality of accessories, wherein the local managing circuit manages the interactions between each of the plurality of accessories mounted on the mounting plate; and means for connecting the local managing circuit to an electronic unit of a motor vehicle, wherein said mounting plate supports the local managing circuit and the connecting means.

* * * * *